United States Patent
Klöppner

(10) Patent No.: US 9,286,183 B2
(45) Date of Patent: Mar. 15, 2016

(54) MONITORING AND DIAGNOSTIC SYSTEM FOR A FLUID ENERGY MACHINE SYSTEM AND FLUID ENERGY MACHINE SYSTEM

(75) Inventor: Gerd Klöppner, Baiersdorf (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 600 days.

(21) Appl. No.: 13/807,962

(22) PCT Filed: Jun. 15, 2011

(86) PCT No.: PCT/EP2011/059934
§ 371 (c)(1),
(2), (4) Date: Jan. 2, 2013

(87) PCT Pub. No.: WO2012/004099
PCT Pub. Date: Jan. 12, 2012

(65) Prior Publication Data
US 2013/0103353 A1    Apr. 25, 2013

(30) Foreign Application Priority Data
Jul. 9, 2010 (DE) .......................... 10 2010 026 678

(51) Int. Cl.
*G06F 11/30* (2006.01)
*G05B 23/02* (2006.01)

(52) U.S. Cl.
CPC .......... *G06F 11/3058* (2013.01); *G05B 23/027* (2013.01); *G05B 23/0235* (2013.01)

(58) Field of Classification Search
CPC ............. G05B 23/0235; G05B 23/027; G05B 23/024; G06F 11/3058
USPC ............ 702/90, 91, 130, 131, 182, 183, 193; 700/231
See application file for complete search history.

(56) References Cited

U.S. PATENT DOCUMENTS

2008/0183427 A1  7/2008  Miller

FOREIGN PATENT DOCUMENTS

| CN | 1401986 A | 3/2003 |
|---|---|---|
| DE | 19903826 A1 | 8/2000 |
| DE | 10024412 A1 | 11/2001 |
| DE | 10222095 A1 | 11/2003 |
| DE | 10220412 A1 | 12/2003 |
| WO | 2010018171 A1 | 2/2010 |

*Primary Examiner* — John H Le

(57) ABSTRACT

A monitoring and diagnostic system for a fluid energy machine system includes a central processing unit to which each sub-system and each system component of the fluid energy machine system is connected via standardized bi-directional interfaces and via one or more data lines, for data communication. Each sub-system and system component has a sensor element for determining status information thereof. The sensor elements are controlled by a control device. A memory device stores the status information determined for the respective sub-system and the respective system component and the comparison data for operating the fluid energy machine system. A comparator unit compares the status information with defined threshold values for each sub-system and system component. A display device displays the status information as well as an alarm in the event of an undershoot or overshoot of a threshold value in the case of a sub-system or a system component.

11 Claims, 4 Drawing Sheets

FIG 5

| System Causes | System Problems | | | | | | | | | | | | | | | |
|---|---|---|---|---|---|---|---|---|---|---|---|---|---|---|---|---|
| | Process problem 1 | Process problem ... | Mechanical problem 1 | Mechanical problem ... | Secondary problem 1 | Secondary problem ... | Motor problem 1 | Motor problem ... | Cooling problem 1 | Cooling problem ... | Transformer station problem 1 | Transformer station problem ... | Operator problem 1 | Operator problem ... | Maintenance problem 1 | Maintenance problem ... |
| Process cause 1 | | | | | | | | | | | X | | | | | |
| Process cause ... | X | | | | | | X | | | | X | | | | | |
| Mechanical cause 1 | | | | | | | | | X | | X | | | | | |
| Mechanical cause ... | | X | | X | | | | | | | | | | | | |
| Secondary cause 1 | | | | | X | | | | | | | | | | | |
| Secondary cause ... | | X | | | | | X | | | | | | | | X | |
| Motor cause 1 | | | X | | | | | | | | | | | | | |
| Motor cause ... | X | | | | | | | | X | | | | | | | |
| Cooling cause 1 | | | | | X | | | | | | | | | | | |
| Cooling cause ... | | | | | | | | | X | | | | X | | | |
| Transformer station cause 1 | X | | X | | | | | | | | | | | | | |
| Transformer station cause ... | | | | X | | | | | | | | | | | | |
| Operator cause 1 | | X | | | | | | | X | | | | | | | |
| Operator cause ... | | | | | | | | X | | | | | X | | | |
| Maintenance cause 1 | | | | | | | | | | | | | | | | X |
| Maintenance cause ... | X | | | | | | | | | | X | | | | | | ism and Fluid Energy Machine System

CROSS REFERENCE TO RELATED APPLICATIONS

This application is the US National Stage of International Application No. PCT/EP2011/059934, filed Jun. 15, 2011 and claims the benefit thereof. The International Application claims the benefits of German application No. 10 2010 026 678.7 DE filed Jul. 9, 2010. All of the applications are incorporated by reference herein in their entirety.

FIELD OF INVENTION

The invention relates to a monitoring and diagnostic system for a fluid energy machine system, wherein the fluid energy machine system comprises a plurality of different sub-systems and system components. The invention furthermore relates to a fluid energy machine system having a monitoring and diagnostic system and to a method for monitoring and diagnosing a fluid energy machine system.

BACKGROUND OF INVENTION

Fluid energy machine systems, such as electrically driven pump and compressor systems, have many and diverse applications in industry, generally in the process industry, and in particular in the oil and gas industry, for example in conveyor systems, pipelines, refineries, tank farms, etc. The continuous servicing and maintenance of fluid energy machine systems is a fundamental constituent of overall plant operation, in particular with respect to product quality, energy efficiency, plant availability, plant safety, and environmental protection.

Fluid energy machine systems, such as electrically driven pump and compressor systems in particular, encompass but are not limited to the following components: one or more machines doing work such as pumps and/or compressors; gear units, couplings, frames; mechanical and/or electrical speed governing systems; piping and cabling installations; ancillary systems such as, for example, lubricating oil systems, gas seal systems, instrumentation air systems, scavenging air systems, cooling systems, etc.; electric motors for the main drive and other system components; electrical engineering installations such as, for example, switchgear installations, transformers, harmonic filters, reactive-power compensators, etc.; the instrumentation and automation of the plant and the system components incl. software applications, for example for the purpose of operation management, enterprise management, and status monitoring component applications.

At the present time, status monitoring of the aforementioned individual discrete system components constitutes the prior art. Although specific status monitoring systems already exist in a plurality of discrete applications and components, such as in vibration and bearing temperature monitoring for pumps, compressors, gear units or motors for example, the comprehensive monitoring of a fluid energy machine system such as a pump and/or compressor system has not been implemented. Thus, for example, it is not possible with existing status monitoring systems to immediately diagnose whether and to what extent electrical oscillating torques in the motor/drive train, electrical converter defects, such as cell failure for example, or harmonic distortions in the electrical supply network are showing an influence on the process and the affected work machine. Furthermore, it is not possible to make a comparison with historically similar operating data for a fluid energy machine system.

As described above, electrically driven pump or compressor systems, for example, consist of various mechanical, electrical, and automation-related system components. In particular, critical system components such as, for example, frequency converters, electric motors, drive machines, mechanical drives, transformers, and switchgear installations, etc., and also ancillary systems such as, for example, lubricating oil systems, scavenging air systems, cooling systems, etc., and automation systems such as, for example, plant or station automation, are equipped as a rule with discrete status monitoring systems and discrete plant systems. This means that separate status monitoring systems and corresponding alarm systems exist for each individual system component. Alongside this, the servicing and maintenance of the pump or compressor system or their system components is supported by servicing and maintenance software systems such as, for example, operation management systems, enterprise management systems or remote maintenance systems.

Status monitoring of individual components of a fluid energy machine system such as, for example, pump or compressor trains, constitutes the prior art. Thus, it is known that status monitoring of bearings, housings, winding temperatures or machine vibrations, etc. can be carried out. The automation facility for a frequency converter monitors harmonic distortions, for example, but does not compare these with the information from the status monitoring facility for the pump or compressor train or other current or historical process data for the process and the ancillary systems. As a result, for example, the influence of electrically induced oscillating torques in electric motors on equipment train vibrations or similarly other relevant system component conditions can not be analyzed and classified automatically and systematically.

SUMMARY OF INVENTION

The object of the invention is therefore to create a monitoring and diagnostic system for fluid energy machine systems, a fluid energy machine system, and also a method for monitoring and diagnosing a fluid energy machine system, which enables cross-system comprehensive monitoring and diagnosis of the fluid energy machine system. Comprehensive system monitoring and diagnosis should fundamentally enhance and improve the state of awareness and knowledge relating to the current plant status of a fluid energy machine system and its individual components.

This object is achieved by the features of the independent claim(s). Further features and details of the invention arise from the sub-claims, the description, and the drawings. In this respect, features and details that are described in connection with the inventive monitoring and diagnostic system naturally also apply in connection with the inventive fluid energy machine system, and the inventive method for monitoring and diagnosing a fluid energy machine system, and vice versa in each case, so that all references made apply in mutual respects with regard to the disclosure relating to the individual aspects of the invention.

In accordance with the first aspect of the invention, the object is achieved by means of a monitoring and diagnostic system for a fluid energy machine system, wherein the fluid energy machine system comprises a plurality of different sub-systems and system components. The monitoring and diagnostic system is characterized according to the invention in that said system has a central processing unit, each subsystem and each system component is connected via standardized bi-directional interfaces and via one or more data lines to the central processing unit for the purpose of data communication, each sub-system and each system component has at least one sensor element for determining status information for the respective sub-system and the respective system component, at least one control device is provided for controlling the sensor elements, a memory device is provided for storing the status information determined for the respective sub-system and the respective system component and also for storing comparison data for the purpose of operating the fluid energy machine system, a comparator unit is provided for comparing the status information determined for the respective sub-system and the respective system component with defined threshold values for each sub-system and each system component, and a display device is provided for displaying the status information determined for the respective sub-system and the respective system component, and also for displaying an alarm in the event of an undershoot or overshoot of a threshold value in the case of a sub-system or a system component. A monitoring and diagnostic system of this type for a fluid energy machine system, such as an electrically driven pump or compressor system for example, enables comprehensive system monitoring and the provision of classifications, for example of the status and the efficiency of the overall system. The monitoring and diagnostic system enables comprehensive quantitative diagnosis and/or analysis of the fluid energy machine system on a current, historical or future-projected basis. For example, the all-embracing monitoring and diagnostic system can increase system utilization, and therefore capital utilization, by means of calculation and display of current parameters relating to system performance and system efficiency. Furthermore, system availability can be increased by means of the comprehensive system diagnosis of the fluid energy machine system. This enables the minimization of unplanned downtime costs, the reduction of planned downtime costs, and the reduction of replacement part storage costs. The monitoring and diagnostic system supports, promotes and simplifies the operational status-based servicing of the fluid energy machine system, for example. Furthermore, by means of continuous early-stage detection of weak spots in the process and the system components, the monitoring and diagnostic system enables increased system safety and an improved contribution to environmental protection and industrial health & safety. In addition, the inventive monitoring and diagnostic system enables a low-cost solution to status-based servicing and remote maintenance, incl. the analysis of very large quantities of data and operational knowledge generation. In particular, the monitoring and diagnostic system supports the monitoring and status-based classification of the critical sub-systems and system components of the fluid energy machine system.

The fluid energy machine system comprises a plurality of different sub-systems and system components. Thus, for example, the fluid energy machine system can have, as system components, one or more machines doing work such as pumps or compressors, gear units, couplings, frame elements, mechanical and/or electrical speed governors, piping and cabling installations, and also electric motors for the main drive or other components, electrical engineering installations such as, for example, switchgear installations, transformers, harmonic filters, reactive-power compensators, instrumentation, and also ancillary systems such as lubricating oil systems, gas seal systems, instrumentation air systems, scavenging air systems or cooling systems. This means that the monitoring and diagnostic system integrated in the fluid energy machine system integrates and supplements existing sub-systems such as, for example, automation systems, and in particular system components, ancillary system components, frequency converters, switchgear installations, motor control units, and also status monitoring systems for rotating machines, for example, and software systems for servicing, for operation management, and for enterprise planning. The monitoring and diagnostic system enables near-real-time support for operation management, and in particular also for servicing with respect to status-based and forward-looking operation management strategies and servicing strategies.

The monitoring and diagnostic system for a fluid energy machine system, which comprises a plurality of different sub-systems and system components, has a central processing unit. Each sub-system and each system component of the fluid energy machine system is connected via standardized bi-directional interfaces and via one or more data lines or data connections to the central processing unit for the purpose of data communication. Each sub-system and each system component of the fluid energy machine system has at least one sensor element for determining status information for the respective sub-system or the respective system component. Furthermore, the monitoring and diagnostic system has a control device that is connected to the central processing unit, and in particular forms part of the central processing unit, for the purpose of controlling the plurality of sensor elements. A memory device is used for storing the status information determined for the respective sub-system and the respective system component, and also for storing comparison data for the purpose of operating the fluid energy machine system. In a comparator unit of the monitoring and diagnostic system, it is possible to carry out a comparison of the status information determined for the respective sub-system and the respective system component with defined threshold values for each sub-system and each system component, and in particular a comparison with known data for the purpose of operating a fluid energy machine system. In addition, a display device is provided for displaying the status information determined for the respective sub-system and the respective system component, and also for displaying an alarm in the event of an undershoot or overshoot of a threshold value in the case of a sub-system or a system component. This means that the monitoring and diagnostic system enables data collection and data storage in a memory device, and in particular in databases, and also data processing of the collected, and in particular time-stamped, data and alarms, for the purpose of analysis and diagnosis, for example on the basis of time series, process models, specific parameters, etc. in the monitoring and diagnostic system. Furthermore, it is also possible to archive the collected data for the purpose of analysis and diagnosis in the monitoring and diagnostic system. By means of a comparison between the status information determined and historical operating modes for a fluid energy machine system, a comprehensive conclusion about the status of the fluid energy machine system can be drawn in a timely manner.

In accordance with a preferred development of the invention, provision can be made in the case of the monitoring and diagnostic system that the central processing unit has hard-wired or wireless interfaces for local and/or remote control of the central processing unit. Thus, for example, a plant operator or servicing and maintenance personnel can carry out local control of the central processing unit or the control device assigned to the central processing unit via an input unit, for example a keyboard. Alternatively or additionally, the monitoring and diagnostic system underpins the support of remote control of the central processing unit. Preferably, therefore, in the case of the monitoring and diagnostic system, Internet protocols, interfaces and/or bus systems are provided for the purpose of data communication between the respective sub-systems and also the respective system components and the central processing unit. For example, corresponding interfaces and protocols can be provided, such as the TCP/IP networking protocol for example, and also profibus, fieldbus, CAN bus, and modbus systems, but also direct analog cable connections. The provision of the required interfaces and protocols for integrating the sub-systems and also the system components means that no costly proprietary applications for monitoring and diagnosing the fluid energy machine system are required.

The central processing unit can form a direct part of the fluid energy machine system but it can also be arranged at a distance from the fluid energy machine system. Preferably, the control device of the monitoring and diagnostic system is directly connected to the central processing unit for the purpose of controlling the sensor elements.

In accordance with a particularly preferred development of the invention, provision can be made in the case of the monitoring and diagnostic system that the comparator unit has an analysis device for reviewing status information determined for at least one sub-system or at least one system component relative to other sub-systems or system components of the fluid energy machine system. The analysis device enables diagnosis of the fluid energy machine system to be carried out. In particular, diagnosis for the purpose of recommendation or notification on an agreed cross-system basis, for example of timelines, operating modes, and plant modes, can be carried out by using analysis and correlation of the sub-systems and system components. This enables comprehensive status monitoring and status-based classification of the fluid energy machine system, and in particular of the pump and compressor system. The comparator unit or analysis device enables calculation of current status-dependent parameters and supports status-based and forward-looking servicing of the fluid energy machine system. The analysis device enables analysis of the fluid energy machine system, and in particular of the sub-systems and system components, for example by using model-based evaluations while taking account of historical operating and fault scenarios. The use of diagnostic models for the purpose of status monitoring enables coding of plant knowledge and continuous adapted use of a plant. The monitoring and diagnostic system can, for example, carry out comprehensive cross-system analysis and classification, and also monitoring of, for example, power network malfunctions, coolant levels, filter contamination, pipe blockages, etc., in order to prevent more far-reaching catastrophic plant failures looking forward. The continuous comprehensive system monitoring and classification means that knowledge about the current plant status and system components is fundamentally enhanced. For example, comparison and correlation of operating modes and periods with respect to availability and reliability of system components and plant systems enables a quantitative capability to carry out updating of the mean operating time between failures and the failure criteria on a continuous basis.

Also preferred is a monitoring and diagnostic system in which the display device is designed for acoustic and/or optical display of an alarm.

Also preferred is a monitoring and diagnostic system in which the processing unit is designed for creating electronic telegrams. This means that in the event of an overshoot or undershoot of defined threshold values, the monitoring and diagnostic system can trigger warnings and alarms, and generate electronic telegrams, for example for the purpose of notifying plant operators, servicing personnel or maintenance personnel, or bringing in operation management and enterprise management systems.

In accordance with a second aspect of the invention, the object is achieved by means of a fluid energy machine system with a monitoring and diagnostic system that is designed in accordance with the first aspect of the invention, wherein the fluid energy machine system comprises a plurality of different sub-systems and system components and each sub-system and each system component has in each case at least one sensor element for determining status information for the respective sub-system and the respective system component. A fluid energy machine system designed in this way enables comprehensive monitoring of the fluid energy machine system. The status information for a sub-system or a system component can be used for the purpose of monitoring the overall system. The fluid energy machine system preferably encompasses a fluid energy machine such as, for example, a pump or a compressor, and also a shaft coupling, an electric motor with a motor control unit, a frequency converter and/or a transformer station, for example with switchgear installations and transformers. Furthermore, there can be provision for gear units, couplings, frame elements, mechanical and/or electrical speed governors, pipe and cable installations, and also electrical engineering installations such as, for example, switchgear installations, transformers, harmonic filters, reactive-power compensators, and automation systems. In addition, a fluid energy machine system is preferred if it has, as a sub-system, a lubricating oil system, a scavenging air system, a gas seal system, instrumentation air systems and/or at least one cooling system.

In accordance with a third aspect of the invention, the object is achieved by means of a method for monitoring and diagnosing a fluid energy machine system, wherein the fluid energy machine system comprises a plurality of different sub-systems and system components, by using a monitoring and diagnostic system that is designed in accordance with the first aspect of the invention.

The method for monitoring and diagnosing a fluid energy machine system is characterized in particular in that a central processing unit communicates via standardized bi-directional interfaces and via one or more data lines or data connections with each sub-system and each system component, said at least one sensor element of the respective sub-systems and also of the respective system components being controlled by at least one control device that is connected to the central processing unit for the purpose of determining status information for the respective subsystem and the respective system component, and that the status information determined by the respective sensor elements for the respective sub-systems and the respective system components and also comparison data for the purpose of operating the fluid energy machine system is stored in a memory device, and that the comparator unit compares the status information determined for the respective sub-system and the respective system components with defined threshold values for each sub-system and each system component, and that a display device displays the status information determined for the respective sub-system and the respective system component and also an alarm in the event of an undershoot or overshoot of a threshold value in the case of a sub-system or a system component.

The remote and/or local monitoring and diagnostic system, which is, in particular, continuous, for a fluid energy machine system, and in particular for an electrically driven pump or compressor system, performs collection, recording and archiving of data and information, for example alarms, about the sub-systems and system components in order inter alia to perform model-based analysis, compile trend curves and correlations/cross-correlations, and provide objective parameters with reference to the current status of the fluid energy machine system, and in particular of the pump or compressor system, by using continuous system monitoring and status-based classification of the status and efficiency of the overall system. This enables quantitative diagnosis and/or analysis of the overall system. As a rule, the monitoring and diagnostic system only needs the instrumentation, and in particular the sensor elements, already installed in order to perform its function. Additional sensor elements for the purpose of diagnosis can be integrated into the monitoring and diagnostic system at any time if needed. The unified monitoring and diagnostic system for a fluid energy machine system enables, in particular, an increase in system/plant utilization and therefore capital utilization, by means of calculation and display of current parameters relating to system performance and system efficiency. The monitoring and diagnostic system increases system/plant availability by means of continuous overall system diagnosis. For example, operational status-based servicing can be supported, promoted, and simplified by means of the monitoring and diagnostic system. In particular, the minimization of unplanned downtime costs, the reduction of planned downtime costs, and also the reduction of replacement part store costs can be achieved by means of the monitoring and diagnostic system or the method for monitoring and diagnosing a fluid energy machine system. Furthermore, system/plant safety and also improved environmental protection can be ensured on a continuous basis by means of early-stage detection of weak spots in the process and the system components. In addition, the monitoring and diagnostic system enables a low-cost solution to status-based servicing and remote maintenance, incl. the analysis of very large quantities of data and operational knowledge generation. The all-embracing monitoring and diagnostic system enables comprehensive monitoring of process and operational conditions, and of mechanical, electrical, and automation-related system components or sub-systems. For example, it is possible to diagnose by means of the monitoring and diagnostic system whether and to what extent electrically induced oscillating torques in the motor/drive train, electrical converter defects, for example cell failure, or harmonic distortions in the electrical supply network are showing an influence on the process and the affected work machine. The monitoring and diagnostic system supports monitoring and status-based classification of, in particular, the critical system components of the fluid energy machine system, and preferably of the pump or compressor system. The monitoring and diagnostic system is based advantageously both on analytical and empirical models, heuristics, trend curves of process and system data, process and system alarms, and also x, y-, and 6-sigma graphs. The monitoring and diagnostic system can provide warnings and alarms in the form of electronic telegrams, in particular about the overall system, for plant operators, servicing personnel, and maintenance personnel. The servicing programs are preferably integrated into the monitoring and diagnostic system. Thus, for example, system components can be classified automatically with respect to their operational and servicing status. Inspection dates can be adapted automatically on a continuous basis and, for example, updated for electrical, automation-related, and mechanical system components; instrumentation and actuators; and also ancillary systems. This represents so-called preventive maintenance. Furthermore, explicit instructions and recommendations can be generated in the event of detection of foreseeable short-/long-term failures of system components and therefore foreseeable deviations from planned inspection plans. The diagnostic system supports both local diagnosis and/or remote diagnosis.

The all-embracing comprehensive monitoring and diagnostic system enables the integration of critical system components such as, for example, frequency converters, electric motors, drive machines, mechanical drives, transformers, and switchgear installations, etc., and also ancillary systems such as, for example, lubricating oil systems, scavenging air systems, cooling systems, etc., and automation systems such as, for example, plant or station automation. At the same time, the comprehensive monitoring and diagnostic system enables servicing and maintenance of the plant and the system components by means of servicing and maintenance software systems such as operation management systems, enterprise management systems, and remote maintenance systems. The integration of all sub-systems and system components for the purpose of diagnosis and analysis of the overall pump and compressor system makes it possible, for example, to carry out correlations/cross-correlations, status-based model-based classifications, etc. for forward-looking servicing strategies.

The status monitoring of pump and compressor trains is then effected with all process data, such as temperatures, quantities and qualities, ancillary system measurements, and the electrical and automation-related components. The automation facility for the frequency converter monitors harmonic distortions and then compares said distortions with the information from the status monitoring facility for the equipment train or other current or historical process data for the process and the ancillary systems. As a result, the influence of electrically induced oscillating torques in electric motors on equipment train vibrations or similarly other relevant system component conditions can then be analyzed and classified automatically and systematically. This is enabled by the comprehensive monitoring and diagnostic system, in particular by means of comprehensive analysis and current/short-term/long-term evaluation of the status and efficiency of, in particular, critical pump and compressor system components. The comprehensive monitoring and diagnostic system enables the collection, recording, and archiving of all data and information from all sub-systems and system components in a central memory device or store respectively, and also analysis and classification for the purpose of diagnosis. Access to the monitoring and diagnostic system described here can be effected both locally and also from outside, that is to say by remote diagnosis.

The continuous remote and/or local monitoring and diagnostic system for fluid energy machine systems such as electrically driven pump or compressor systems integrates and supplements existing sub-systems such as, for example, automation systems such as stations, plants, system components, ancillary systems, frequency converters, switchgear installations, motor control units, etc. with status monitoring systems for rotating machines, and software systems for servicing, operation management, and enterprise planning, etc. The inventive monitoring and diagnostic system enables near-real-time support for operation management, and in particular also for servicing with respect to status-based and forward-looking operation management strategies and servicing strategies.

The monitoring and diagnostic system for a fluid energy machine system encompasses in particular standardized bi-directional interfaces for communicating with the sub-systems and system components, for example for transmitting data and alarms. Corresponding interfaces and protocols, and in particular TCP/IP protocols, profibuses, fieldbuses, mod-buses, direct analog cable connections, etc., are provided by the monitoring and diagnostic system. Data collection and data storage are effected in a memory device of the central processing unit or in databases respectively. This is effected either online and in real time or on an event-driven basis with adapted sampling rates in the monitoring and diagnostic system. Data processing of the collected time-stamped data and alarms for the purpose of analysis and diagnosis is effected on the basis of time series, process models, specific parameters, etc. in the monitoring and diagnostic system. Furthermore, the archiving of the collected time series for the purpose of analysis and diagnosis is effected in the memory device of the central processing unit of the monitoring and diagnostic system. Furthermore, the monitoring and diagnostic system enables application-supported analysis of the archived time series and alarms for the purpose of diagnosis in comparison with historical operating modes also. Direct access to current parameters, in particular with reference to plant statuses and efficiency, can be effected via the sensor elements. Furthermore, the monitoring and diagnostic system is designed for automatic creation of electronic telegrams for local and/or remote maintenance personnel and service personnel, but also for electronic operation management systems by using the monitoring and diagnostic system.

The inventive monitoring and diagnostic system permits both local and remote access. For example, the cross-system monitoring and diagnostic system enables near-real-time and temporally consistent analysis and archiving of status information originating from the mechanical train, frequency converter, supply network, etc. This analysis and diagnosis is effected either locally or via remote maintenance. The complete integration of status monitoring systems, over and above the pure interface configuration, and the integration of task-specific applications into the monitoring and diagnostic system is possible if required.

The continuous remote or local monitoring and diagnostic system for fluid energy machine systems, such as electrically driven pumps or compressor systems, enables cross-sub-system comprehensive diagnosis of the affected plants and system components.

Fundamental features and advantages of the monitoring and diagnostic system for fluid energy machine systems, and in particular for electrically driven pumps or compressor systems, comprise:

a) Provision of the required interfaces and protocols for integrating the aforesaid sub-systems, including the ancillary systems. No costly proprietary adaptations are therefore necessary.

b) Collection and consistent recording of the relevant data, information, and alarms from the automation systems of the sub-systems or direct from the sub-systems respectively. This ensures temporal consistency for determining cause and effect and ensures classification of the information even in advance of a fault incident. Overall, this fundamentally reduces analysis/diagnosis times and costs.

c) Archiving of the relevant data and alarms independently of the capabilities and limitations of the sub-systems. Only with this is the opportunity created to make comparisons with the plant history. This is a necessity, in particular in order to develop model-assisted diagnostic applications.

d) Diagnosis for the purpose of recommendation and notification on an agreed cross-system basis, for example time-line, operating modes, and plant modes, by using analysis and cross-correlation of the sub-systems and data and alarms from the ancillary systems together with operation and enterprise management systems. This enables comprehensive status monitoring and status-based classification of the fluid energy machine system or pump or compressor system respectively, and also of the individual system components. Current status-dependent parameters are calculated and status-based forward-looking servicing is supported.

e) Analysis of system status and the system components by using model-assisted evaluation while taking account of historical operating and fault scenarios. The use of diagnostic models for status monitoring enables the coding of system knowledge and continuous adapted use.

f) The monitoring and diagnostic system forms the central point of contact for local and/or remote maintenance and servicing for all relevant sub-systems of the plants and system components. Diagnosis can be carried out in minimum time and at minimum cost, in particular also with respect to the lifecycle of the diagnostic system.

g) Integrated comprehensive analysis and diagnosis of the critical mechanical, electrical, instrumentation-related, and automation-related components of the pump and compressor system including the ancillary systems.

Status-based monitoring of just one pump and compressor train, as known from the prior art, can indeed predict incipient bearing damage at an early stage but of course remains limited to that equipment train and can not take account of abnormal statuses in the process itself, in the electrical supply network or in the ancillary systems. This is where the inventive monitoring and diagnostic system takes hold by means of comprehensive cross-platform analysis and classification, and also monitoring of network malfunctions, coolant levels, filter contamination, pipe blockages, etc., in order to prevent more far-reaching catastrophic plant failures looking forward.

The continuous comprehensive system monitoring and classification means that knowledge about the current plant status of the fluid energy machine system including the sub-systems and system components is fundamentally enhanced. For example, comparison and correlation of operating modes and periods with respect to availability and reliability of system components and plant systems enables a quantitative capability to carry out updating of the mean operating time between failures and the failure criteria on a continuous basis.

The fluid energy machine system, and in particular a pump system, encompasses in particular a machine doing work such as a pump, at least one shaft coupling, at least one electric motor, at least one frequency converter, and at least one transformer station. In addition, ancillary systems such as, for example, lubricating oil systems, scavenging air systems, and cooling systems, for example for the frequency converter, can be integrated. The work machine is controlled and regulated by using a control unit, and in particular a plant control unit, of the monitoring and diagnostic system. Alongside this, there are discrete regulating units for the system components such as the motor, frequency converter, switchgear installation, and other ancillary systems. These sub-systems deliver relevant data and information for the monitoring and diagnostic system. Moreover, an electronic plant operator logbook and operation and enterprise management systems, for example for the servicing, may be available as further sources of data and information.

The following measured values, data, alarms, and interfaces, while not being restrictive, are fed to the inventive monitoring and diagnostic system.

a) From a transformer station: voltages and currents (primary/secondary side) and/or phase angles. Furthermore, messages regarding alarms, faults, and statuses relating to the switchgear installations, reactive-power compensators, transformers and/or harmonic filters.

b) From a frequency converter: voltages and voltage harmonics, currents and current harmonics, rms values of currents and voltages, phase angles, apparent powers, reactive powers, actual powers, torques, speeds (actual and target values), converter efficiencies and/or messages regarding alarms, faults, and statuses relating to the frequency converter system.

c) From a motor control unit: voltages, currents, phase angles, apparent powers, reactive powers, actual powers, torques, motor efficiencies, winding temperatures, and messages regarding alarms, faults, and statuses relating to the motor.

d) From the status monitoring facility of a rotating machine: bearing temperatures, housing temperatures, vibration data for radial or axial vibrations and/or messages regarding alarms, faults, and statuses.

e) From the ancillary systems: coolant temperatures, coolant pressures or coolant levels, ambient air temperatures, differential pressures on filters, lubricating oil pressures, auxiliary agent mass flow rates and/or messages regarding alarms, faults, and statuses.

f) From a plant control unit: flow volumes, process temperatures, process pressures, process qualities and/or messages regarding alarms, faults, and statuses.

g) From a plant operator logbook: operating modes, plant operator observations and entries, abnormal operating and plant conditions, servicing systems, maintenance intervals, maintenance instructions, maintenance manuals, maintenance personnel planning and replacement part planning, data sheets for the system components, for plant apparatus, and for plant machines, and/or technical drawings and manuals.

h) Data interfaces, it being possible to effect data transmission between the sub-systems both synchronously and asynchronously. Data transmission can be effected via cable (4-20 mA), Ethernet, profibuses, fieldbuses, and/or modbuses. Data transmission can also be effected on a wireless basis.

The inventive monitoring and diagnostic system preferably provides a remote maintenance functionality via a remote maintenance platform. The monitoring and diagnostic system described collects and records the relevant data and alarms from the discrete sub-systems and system components. If needed, additional sensors and also further sub-systems can also be embedded in the monitoring and diagnostic system. The monitoring and diagnostic system described analyses, correlates, compares, and generates graphs and also diagnostic indicators, and in particular on a cross-system basis, with alarm and warning thresholds.

In the event of an overshoot or undershoot of definable threshold values, the monitoring and diagnostic system triggers its own warnings and alarms, and creates electronic telegrams, for example for notifying plant operators, servicing personnel or maintenance personnel or for the purpose of bringing in operation and enterprise management systems.

Furthermore, the diagnostic system described enables classification of the plant status on the basis of empirical tables. For example, if the efficiency of the pump should undershoot a lower threshold value, the probable process-related, mechanical, electrical or automation-related causes can be derived from such empirical tables and corresponding servicing activities can be triggered and planned.

BRIEF DESCRIPTION OF THE DRAWINGS

The invention and its developments, and also its advantages, are explained in detail below on the basis of drawings. These show the following in schematic form in each case:

FIG. 5 An exemplary assignment table for classifying fault causes.

DETAILED DESCRIPTION OF INVENTION

Elements with the same function and mode of action are provided with the same reference symbols in each case in FIGS. 1 to 5.

Figure 1:
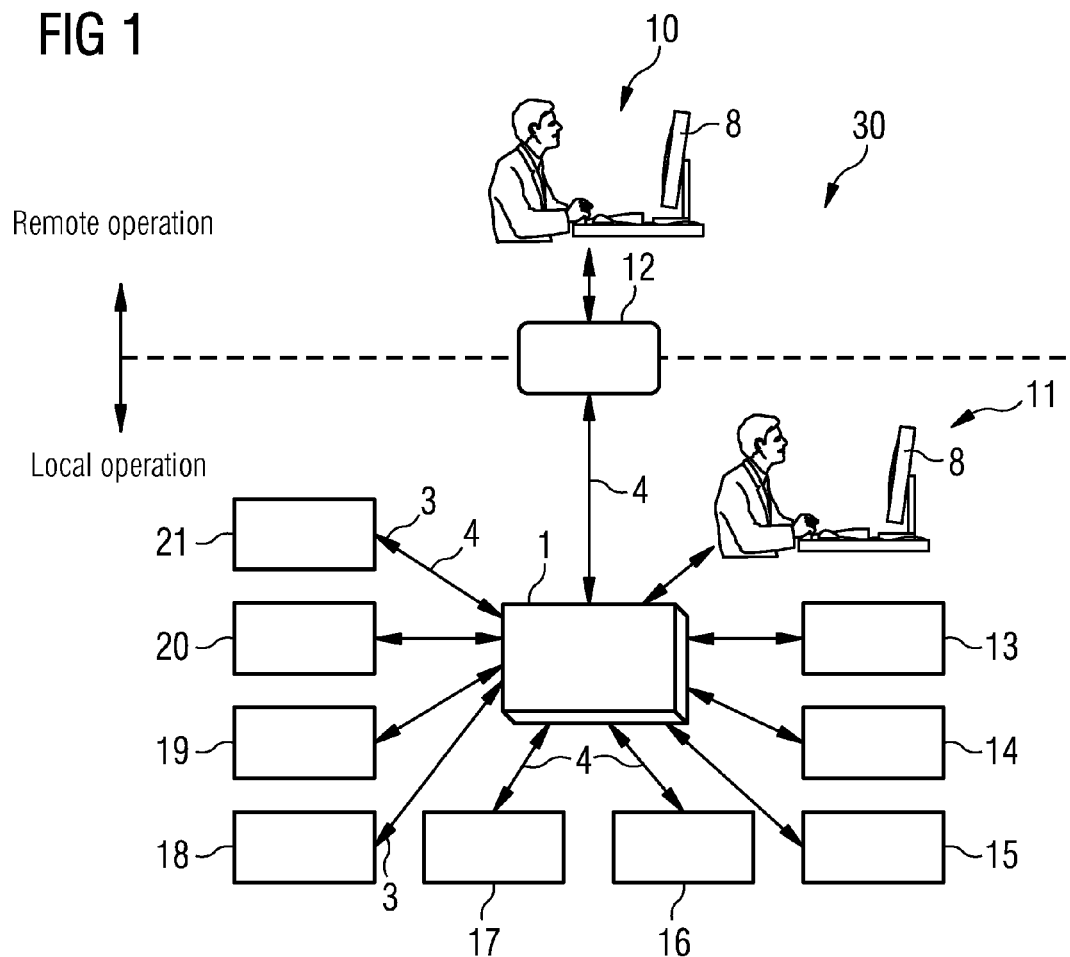
FIG. 1 A fluid energy machine system with a local and/or remote monitoring and diagnostic system that is designed in accordance with the inventive design principle.

FIG. 1 shows in schematic form a fluid energy machine system 30 with a local and/or remote monitoring and diagnostic system 1 that is designed in accordance with the inventive design principle. The remote and/or local monitoring and diagnostic system 1 for the fluid energy machine system 30, such as an electrically driven pump or compressor system, integrates and supplements existing sub-systems, such as, for example, automation systems 18, ancillary systems 16, stations and plants 19, and system components such as frequency converters 14, switchgear installations or transformer stations 13, motor control units 15, etc., with status monitoring systems 17 for rotating machines, and software systems for servicing 25, for operation management and for enterprise planning 21, etc. The inventive monitoring and diagnostic system 1 enables near-real-time support for operation management, and in particular also for servicing with respect to status-based and forward-looking operation management strategies and servicing strategies.

The monitoring and diagnostic system 1 for the fluid energy machine system 30 encompasses in particular standardized bi-directional interfaces 3 for communicating with the sub-systems 16, 17, 18, 19, 20, 21, 22, 25, 26 and system components 13, 14, 15, 23, 24, for example for transmitting data and alarms. Corresponding interfaces and protocols, and in particular TCP/IP protocols, profibuses, fieldbuses, modbuses, direct analog cable connections, etc., are provided by the monitoring and diagnostic system 1. Data collection and data storage are effected in a memory device 5 of the central processing unit 2 or in databases respectively. This is effected either online and in real time or on an event-driven basis with adapted sampling rates in the monitoring and diagnostic system 1. Data processing of the collected time-stamped data and alarms for the purpose of analysis and diagnosis is effected on the basis of time series, process models, specific parameters, etc. in the monitoring and diagnostic system 1. Furthermore, the archiving of the collected time series for the purpose of analysis and diagnosis is effected in the memory device 5 of the central processing unit 2 of the monitoring and diagnostic system 1. Furthermore, the monitoring and diagnostic system 1 enables application-supported analysis of the archived time series and alarms for the purpose of diagnosis in comparison with historical operating modes also. Direct access to current parameters, in particular with reference to plant statuses and efficiency, can be effected via the sensor elements. Furthermore, the monitoring and diagnostic system 1 is designed for automatic creation of electronic telegrams for local and/or remote maintenance personnel and service personnel, but also for electronic operation management systems 21 by using the monitoring and diagnostic system 1.

The inventive monitoring and diagnostic system 1 permits both local and remote access. For example, the cross sub-system monitoring and diagnostic system 1 enables near-real-time and temporally consistent analysis and archiving of status information originating from the mechanical train 23, frequency converter 13, supply network 26, etc. This analysis and diagnosis is effected either locally or via remote maintenance. The complete integration of status monitoring systems 17, over and above the pure interface configuration, and the integration of task-specific applications into the monitoring and diagnostic system 1, is possible if required.

Figure 2:
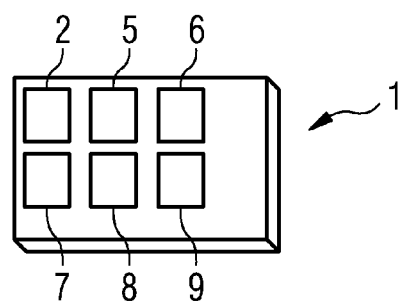
FIG. 2 A monitoring and diagnostic system for a fluid energy machine system, the monitoring and diagnostic system being designed in accordance with the inventive design principle.

FIG. 2 shows in schematic form a monitoring and diagnostic system 1 for a fluid energy machine system 30, wherein the monitoring and diagnostic system 1 is designed in accordance with the inventive design principle. The monitoring and diagnostic system 1 has a central processing unit 2. Furthermore, a control device 5 is provided for controlling sensor elements. In addition, a memory device 6 is provided for storing status information determined by the sensor elements for the respective sub-system 16, 17, 18, 19, 20, 21, 22, 25, 26 and the respective system component 13, 14, 15, 23, 24, and also for storing comparison data for operating the fluid energy machine system 30. Similarly, a comparator unit 7 is provided for comparing the status information determined for the respective sub-system and the respective system component with defined threshold values for each sub-system and each system component. Furthermore, the monitoring and diagnostic system 1 has a display device 8 for displaying the status information determined for the respective sub-system and the respective system component, and also for displaying an alarm in the event of an undershoot or overshoot of a threshold value in the case of a sub-system or a system component.

Figure 3:
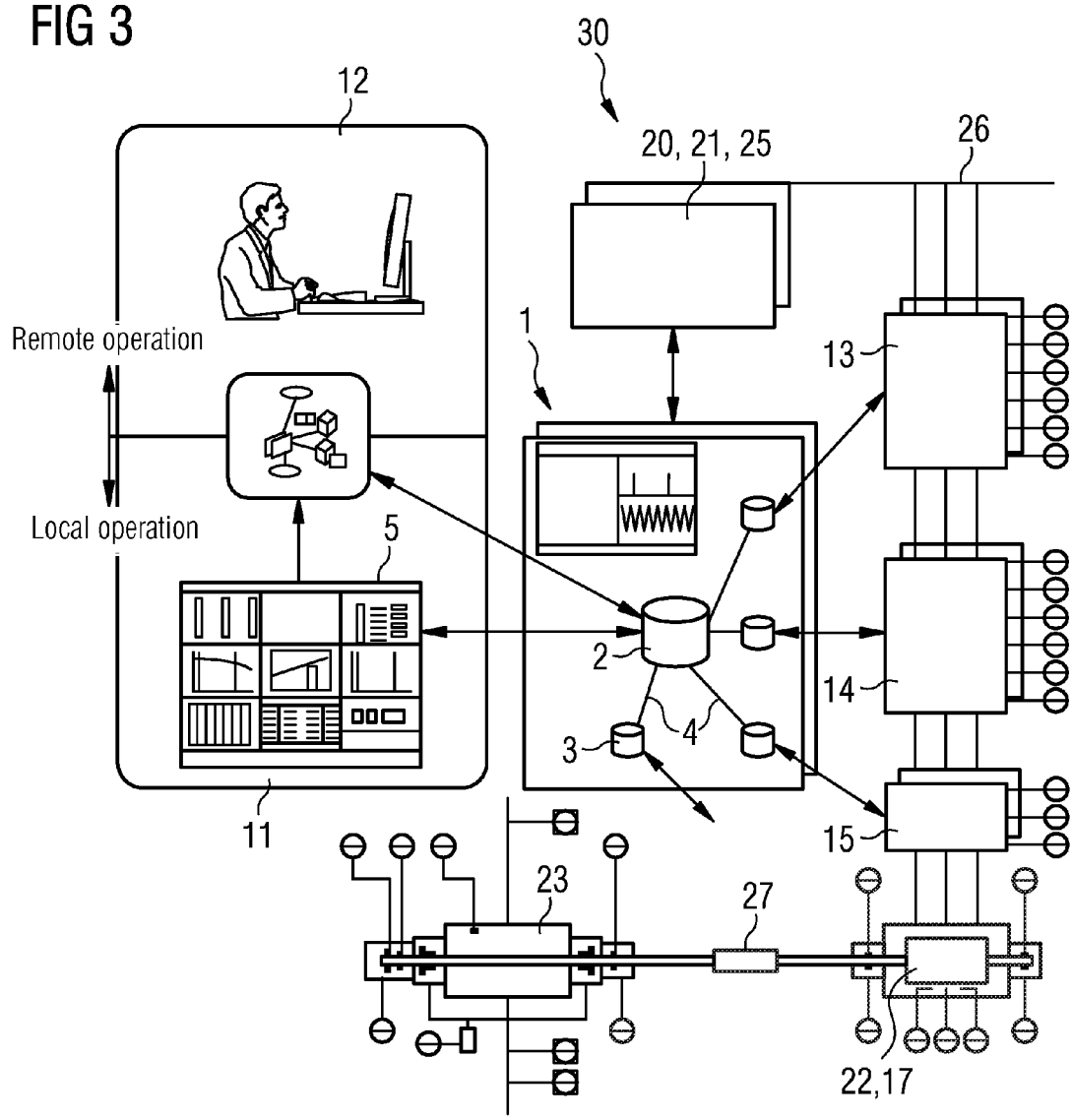
FIG. 3 A representation of the architecture of a monitoring and diagnostic system using the example of an electric pump system.

FIG. 3 shows in schematic form a representation of the architecture of a monitoring and diagnostic system 1 using the example of an electric pump system 30. The fluid energy machine system 30 encompasses in particular a machine doing work 23, such as a pump or compressor, at least one shaft coupling possibly together with a gear unit with constant or variable transmission 27, at least one electric motor 15, at least one frequency converter 14, and at least one transformer station 13. In addition, ancillary systems such as, for example, lubricating oil systems, scavenging air systems, and cooling systems, for example for the frequency converter 13, can be provided. The work machine 23 is controlled and regulated by using a control unit 5, and in particular a plant control unit, of the monitoring and diagnostic system 1. Alongside this, there are discrete regulating units for the system components, such as the motor 15, the frequency converter 14, the switchgear installation or transformer station 13 respectively, and other ancillary systems. These sub-systems and system components deliver relevant data and information for the monitoring and diagnostic system 1. Moreover, an electronic plant operator logbook 20 and operation and enterprise management systems 21, 25, for example for the servicing, may be available as further sources of data and information.

The following measured values, data, alarms, and interfaces, while not being restrictive, are fed to the inventive monitoring and diagnostic system 1.

a) From the transformer station 13: voltages and currents (primary/secondary side) and/or phase angles. Furthermore, messages regarding alarms, faults, and statuses relating to the switchgear installations, reactive-power compensators, transformers and/or harmonic filters.

b) From the frequency converter 14: voltages and voltage harmonics, currents and current harmonics, rms values of currents and voltages, phase angles, apparent powers, reactive powers, actual powers, torques, speeds (actual and target values), converter efficiencies and/or messages regarding alarms, faults, and statuses relating to the frequency converter system.

c) From the motor 15 and the associated motor control unit: voltages, currents, phase angles, apparent powers, reactive powers, actual powers, torques, motor efficiencies, winding temperatures, and messages regarding alarms, faults, and statuses relating to the motor.

d) From the status monitoring facility 17 of a rotating machine 22: bearing temperatures, housing temperatures, vibration data for radial or axial vibrations and/or messages regarding alarms, faults, and statuses.

e) From ancillary systems not shown: coolant temperatures, coolant pressures or coolant levels, ambient air temperatures, differential pressures on filters, lubricating oil pressures and/or messages regarding alarms, faults, and statuses.

f) From a plant control unit for the pump 23: flow volumes, process temperatures, process pressures, process qualities and/or messages regarding alarms, faults, and statuses.

g) From the plant operator logbook 20: operating modes, plant operator observations and entries, abnormal operating and plant conditions, servicing systems, maintenance intervals, maintenance instructions, maintenance manuals, maintenance personnel planning and replacement part planning, data sheets for the system components, for plant apparatus, and for plant machines, and/or technical drawings and manuals.

Figure 4:
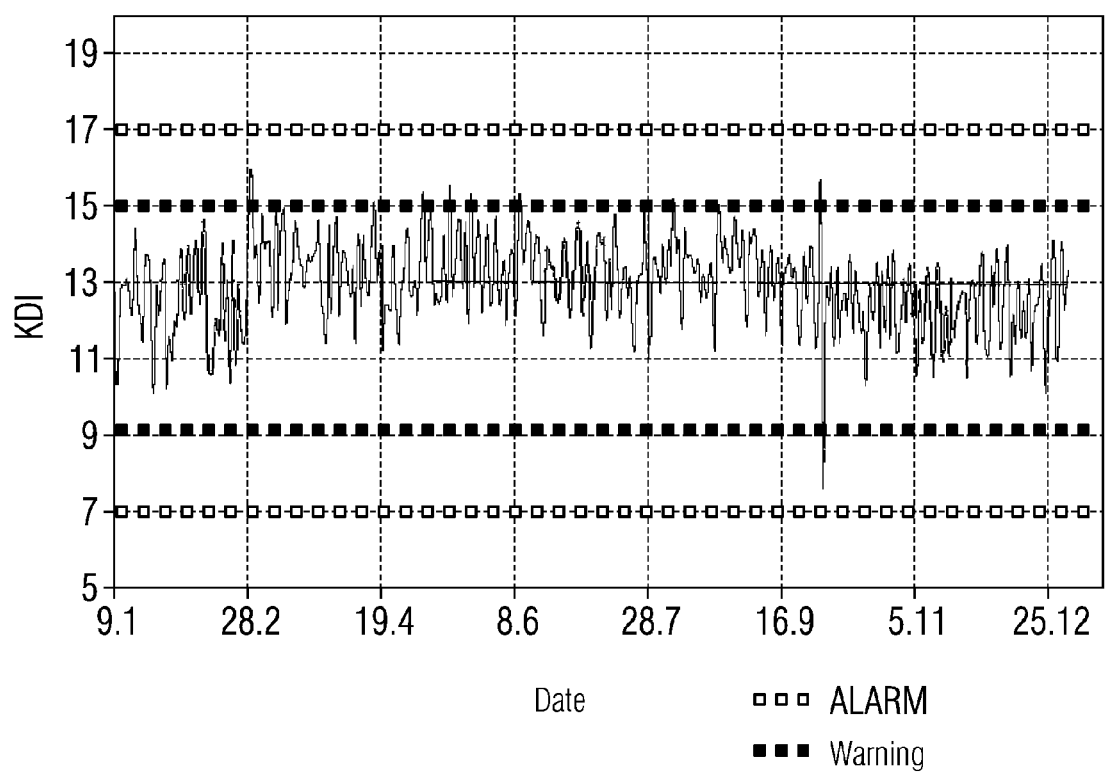
FIG. 4 A profile over time of an exemplary parameter with warning and alarm thresholds.

FIG. 4 shows in schematic form a profile over time of an exemplary parameter KDI with warning and alarm thresholds. In the event of an overshoot or undershoot of definable threshold values, the monitoring and diagnostic system 1 triggers its own warnings and alarms, and creates electronic telegrams, for example for notifying plant operators, servicing personnel or maintenance personnel or for the purpose of bringing in operation and enterprise management systems.

Furthermore, the monitoring and diagnostic system 1 described enables classification of the plant status of the fluid energy machine system 30 on the basis of empirical tables as shown in FIG. 5. For example, if the efficiency of the pump 23 should undershoot a lower threshold value, the probable process-related, mechanical, electrical or automation-related causes can be derived from such empirical tables and corresponding servicing activities can be triggered and planned.

The invention claimed is:

1. A monitoring and diagnostic system for a fluid energy machine system, wherein the fluid energy machine system comprises a plurality of different sub-systems and system components, the monitoring and diagnostic system comprising:

a central processing unit to which each sub-system and each system component is connected via standardized bi-directional interfaces and via one or more data lines, for the purpose of data communication, wherein each sub-system and each system component has at least one sensor element for determining status information for the respective sub-system and the respective system component, at least one control device for controlling the sensor elements, a memory device for storing the status information determined for the respective sub-system and the respective system component and also for storing comparison data for the purpose of operating the fluid energy machine system,
a comparator unit for comparing the status information determined for the respective sub-system and the respective system component with defined threshold values for each sub-system and each system component, and
a display device for displaying the status information determined for the respective sub-system and the respective system component, and also for displaying an alarm in the event of an undershoot or overshoot of a threshold value in the case of a sub-system or a system component wherein the display device is designed for acoustic and/or optical display of an alarm.

2. The monitoring and diagnostic system as claimed in claim 1, wherein the central processing unit has hard-wired or wireless interfaces for local and/or remote control of the central processing unit.

3. The monitoring and diagnostic system as claimed in claim 1, wherein Internet protocols, gateways and/or bus systems are provided for the purpose of data communication between the respective sub-systems and also the respective system components and the central processing unit.

4. The monitoring and diagnostic system as claimed in claim 1, wherein said at least one control device is connected to the central processing unit for the purpose of controlling the sensor elements.

5. The monitoring and diagnostic system as claimed in claim 1, wherein the comparator unit has an analysis device for reviewing status information determined for at least one sub-system or at least one system component relative to other sub-systems or system components of the fluid energy machine system.

6. The monitoring and diagnostic system as claimed in claim 1, wherein the central processing unit is designed for creating electronic telegrams.

7. A fluid energy machine system, comprising:
a plurality of different sub-systems and system components, each sub-system and each system component having in each case at least one sensor element for determining status information for the respective sub-system and the respective system component, and
a monitoring and diagnostic system according to claim 1.

8. The fluid energy machine system as claimed in claim 7, wherein the fluid energy machine system encompasses a fluid energy machine and also a shaft coupling, an electric motor with a motor control unit, a frequency converter and/or a transformer station.

9. The fluid energy machine system as claimed in claim 8, wherein the fluid energy machine system has a lubricating oil system, a scavenging air system and/or at least one cooling system.

10. A method for monitoring and diagnosing a fluid energy machine system, wherein the fluid energy machine system comprises a plurality of different sub-systems and system components, the method comprising:
using a monitoring and diagnostic system according to claim 1 for the purpose of monitoring and diagnosing the fluid energy machine system.

11. The method for monitoring and diagnosing a fluid energy machine system as claimed in claim 10, further comprising:
providing a communication between the central processing unit and each sub-system and each system component via standardized bi-directional interfaces and via one or more data lines,
controlling at least one sensor element of the respective sub-systems and also of the respective system components by at least one control device that is connected to the central processing unit for the purpose of determining status information for the respective subsystem and the respective system component,
storing the status information determined by the respective sensor elements for the respective sub-systems and the respective system components and also comparison data for the purpose of operating the fluid energy machine system in a memory device,
comparing the status information determined for the respective sub-system and the respective system components with defined threshold values for each sub-system via the comparator unit, and
displaying, via the display device, the status information determined for the respective sub-system and the respective system component and also an alarm in the event of an undershoot or overshoot of a threshold value in the case of a sub-system or a system component.

* * * * *